Patented Nov. 28, 1933

1,936,979

UNITED STATES PATENT OFFICE 1,936,979

AZO DYESTUFFS

Erwin Hoffa, Frankfort-on-the-Main-Hochst, and Eugen Glietenberg, Leverkusen, near Cologne, Germany, assignors to General Aniline Works, Inc., New York, N. Y., a corporation of Delaware No Drawing. Application September 28, 1928, Serial No. 309,124, and in Germany October 13, 1927

8 Claims. (Cl. 260—95)

The present invention relates to new azo dyestuffs and to fiber dyed therewith.

We have found, that the diazo compounds of the 2.5-dimethyl-4-halogen-1-aniline are capable of yielding dyestuffs of good fastness to light when coupled with an arylamide of the 2-hydroxynaphthalene-3-carboxylic acid. The new dyestuffs may also be produced on a substratum or on the fiber.

The dyestuffs according to this invention are characterized by the formula:

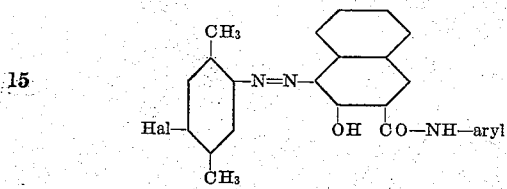

wherein however the aryl radical is free from any group which renders the dyestuffs soluble in an alkaline solution, as, for instance, the sulfonic acid, the carboxylic acid and the hydroxy group.

The following examples serve to illustrate our invention, but they are not intended to limit it thereto, the parts being by weight, unless otherwise stated:

(1) Cotton material is padded with a grounding liquor prepared from 11.1 parts of 2-hydroxynaphthalene-3-carboxylic acid-4'-methoxy-1'-anilide, 36 parts by volume of caustic soda solution of 34° Bé, 24 parts of sodium Turkey red oil of 50% strength, 500 liters of hot water, the whole being made up with water to 1000 liters. The dyeing is then developed with a diazo-solution prepared as follows: 3.1 parts of 1-amino-2.5-dimethyl-4-chlorobenzene are mixed, while stirring, with 5.2 liters of hydrochloric acid of 22° Bé, and some ice-cold water, and to the mixture are added 1.44 parts of sodium nitrite dissolved in water. After the diazotization is complete, the mass is made up with cold water to 1000 liters and neutralized with sodium acetate until it shows a neutral reaction towards Congo paper. After having been washed and soaped in a boiling soap bath, the dyeing shows a middling red tint of very good fastness to chlorine and washing, and of a fastness to light, equal to that ever obtained with developing dyestuffs. The dyestuff thus produced on the fiber has the following structural formula:

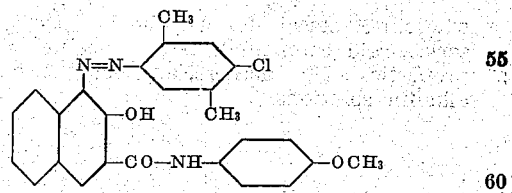

(2) By substituting for the 11.1 parts of 2-hydroxynaphthalene-3-carboxylic acid-4'-methoxy-1'-anilide as used in Example 1, 12.2 parts of 2-hydroxynaphthalene-3-carboxylic acid-2'.5'-dimethoxy-1'-anilide, there is likewise obtained a red tint of very valuable properties as to fastness. The dyestuff may be represented by the formula:

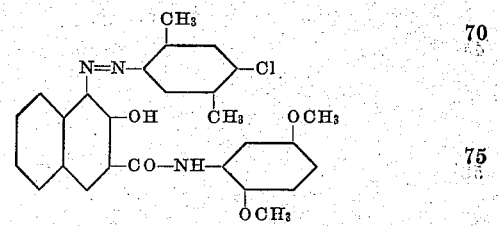

(3) By substituting for the 3.1 parts of 1-amino-2.5-dimethyl-4-chlorobenzene as used in Example 1, 4 parts of 1-amino-2.5-dimethyl-4-bromobenzene, a middling red tint is obtained of good fastness to chlorine and washing and also of a good fastness to light. The dyestuff corresponds with the formula:

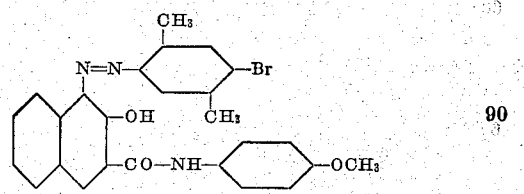

Since an object of the present invention is to provide dyestuffs of good fastness properties, which dyestuffs are insoluble in water and alkalies, it is to be understood that the benzene nucleus of the general formula appearing in the appended claims contains no substituents as are known to render organic compounds soluble in water or alkalies and to tend to depreciate the fastness of the dyestuffs to alkalies. Substituents of this kind are, for instance, the sulfonic acid, the carboxylic acid and the hydroxy group.

We claim:

1. The compound of the formula:

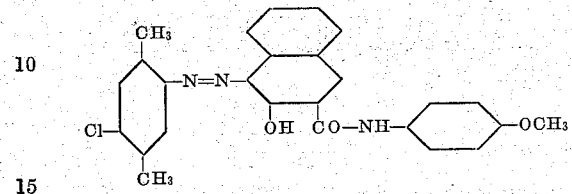

being a red dyestuff of a very good fastness to chlorine and washing and of an excellent fastness to light.

2. The compounds of the general formula:

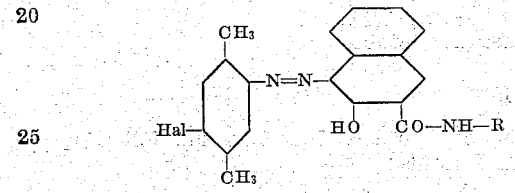

wherein R stands for a radical of the benzene series, said compounds being dyestuffs of good properties as to fastness, and being insoluble in alkaline solutions.

3. The compound of the formula:

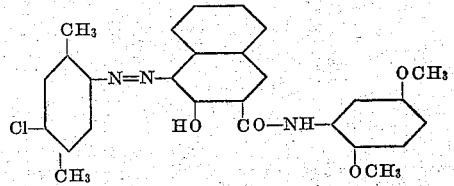

being a red dyestuff of good fastness properties.

4. The compound of the formula:

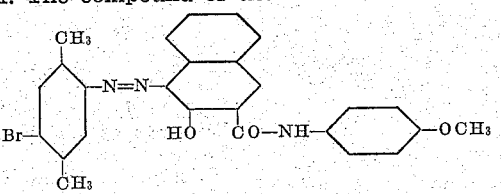

being a red dyestuff of good fastness to chlorine and light.

5. Fiber dyed with a dyestuff as claimed in claim 1.

6. Fiber dyed with a dyestuff as claimed in claim 2.

7. Fiber dyed with a dyestuff as claimed in claim 3.

8. Fiber dyed with a dyestuff as claimed in claim 4.

ERWIN HOFFA.
EUGEN GLIETENBERG.